(12) United States Patent
Kleine et al.

(10) Patent No.: US 6,655,479 B2
(45) Date of Patent: Dec. 2, 2003

(54) TWIST-DRILL BIT

(75) Inventors: Werner Kleine, Achim (DE); Hans-Werner Bongers-Ambrosius, Munich (DE)

(73) Assignee: Hilti Aktiengesellschaft, Schaan (LI)

(*) Notice: Subject to any disclaimer, the term of this patent is extended or adjusted under 35 U.S.C. 154(b) by 0 days.

(21) Appl. No.: 10/032,671

(22) Filed: Oct. 25, 2001

(65) Prior Publication Data

US 2002/0053472 A1 May 9, 2002

(30) Foreign Application Priority Data

Oct. 27, 2000 (DE) .......................... 100 53 342

(51) Int. Cl.$^7$ ............................... E21B 10/44
(52) U.S. Cl. ........................ 175/394; 175/415
(58) Field of Search ............... 175/394, 395, 175/323, 414, 415; 299/87.1; 408/210, 230

(56) References Cited

U.S. PATENT DOCUMENTS

| | | | |
|---|---|---|---|
| 4,549,616 A | * 10/1985 | Rumpp et al. | 175/394 |
| 4,883,135 A | 11/1989 | Moser et al. | 175/323 |
| 4,967,855 A | * 11/1990 | Moser | 175/394 |
| 6,427,789 B1 | * 8/2002 | Fuss et al. | 175/323 |
| 2001/0023783 A1 | * 9/2001 | Obermeier | 175/323 |

FOREIGN PATENT DOCUMENTS

EP 1138871 10/2001

* cited by examiner

*Primary Examiner*—David Bagnell
*Assistant Examiner*—Matthew J Smith
(74) *Attorney, Agent, or Firm*—Sidley Austin Brown & Wood, LLP

(57) ABSTRACT

A helical drill bit (1) for rock has an axially extending shank (2) located between a chuck insert end (3) and an opposite drilling head (4) with at least one axially extending helical discharge groove (7) extending radially inwardly from the outer circumferential surface of the shank. A radially projecting groove reinforcement (9) is arranged in the base of the radial groove (8), with the reinforcement changing its geometric form or its position within the discharge groove (7) along the discharge groove (7).

9 Claims, 1 Drawing Sheet

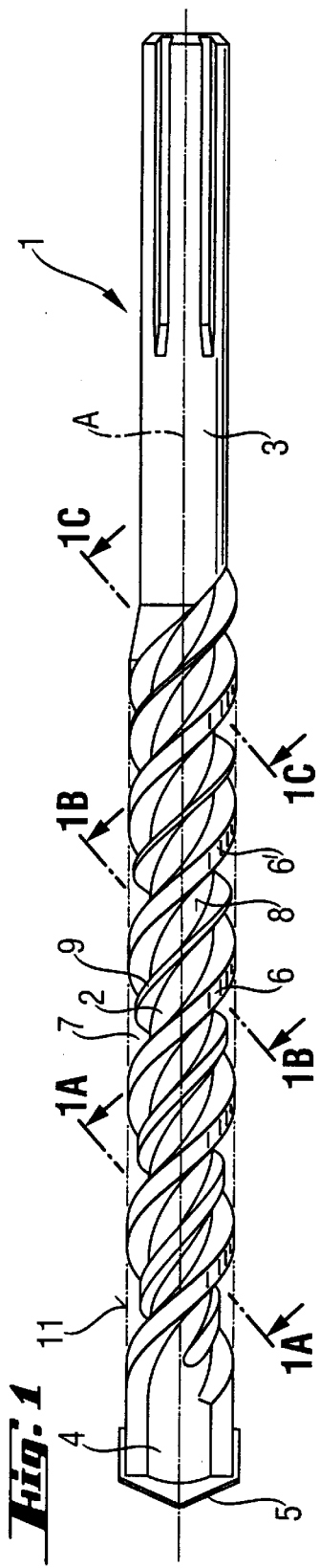
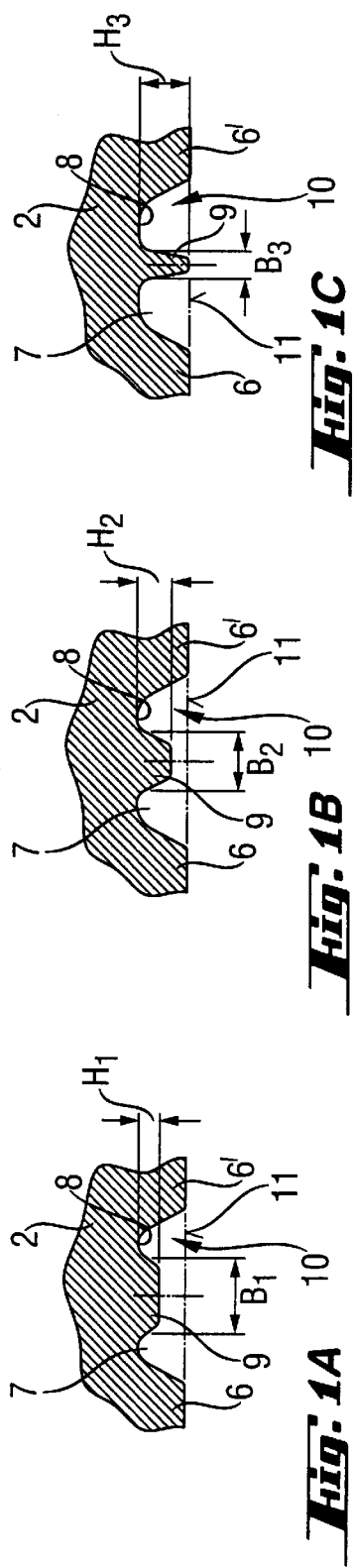
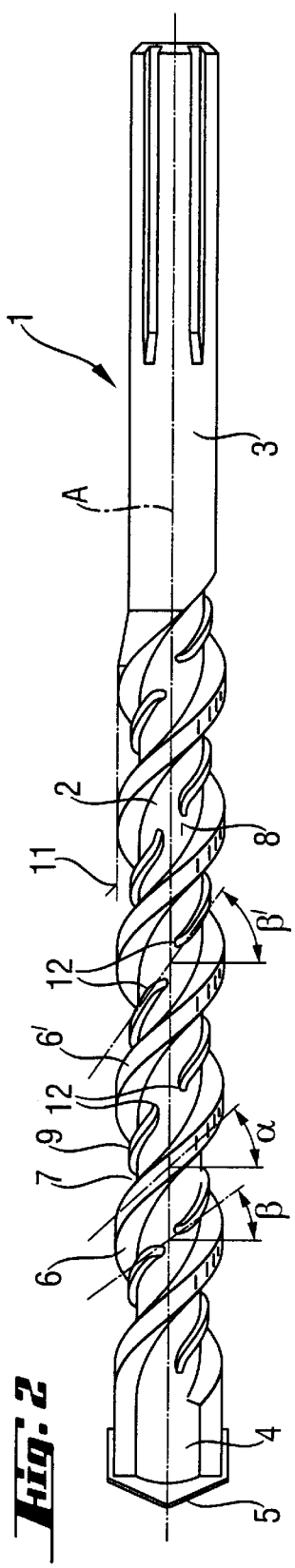

TWIST-DRILL BIT

BACKGROUND OF THE INVENTION

The invention relates to a helical drill bit for use as a drilling tool in a rotary and possibly percussive hand operated drilling device, preferably designed for the percussive-abrasive removal of rock or rock-like material, such as concrete.

Conventional helical drills are characterized by a spiral shaped shank extending axially between an insertion, chuck end and a tool head for removal, with removal being effected by the rotation of the helical drill bit, of abrasively cut or chipped material. The helix generally exhibits several helical turns with associated discharge grooves, through which the material abrasively cut or chipped at the tool head is removed.

In the case of helical drills having large diameters and powerful hand tool devices, the spiral discharge groove for the cuttings is reinforced by providing a circumferential groove reinforcement rib spirally arranged in the bed of the groove, the reinforcement rib serving to enhance resistance to prolonged alternating stresses.

According to DE19753731A1 a helical drill bit for rock is disclosed that is characterized by one or a plurality of groove reinforcement ribs running uniformly along the discharge helix in the grooves formed between the lands or coils, the ribs being a component of the discharge helix due to the radial rib height being less than the height of the lands. The axial rib width is less than the crest width of the lands or run to a point.

Because of the groove reinforcement ribs within the discharge helix or grooves, clumping occurs in the frequently wet, abrasively cut material and, as a result of which, the groove becomes clogged until, ultimately, the drilling tool becomes jammed or there is impulsive separation of the clumped material.

SUMMARY OF THE INVENTION

The object of the invention is to provide a large-diameter helical drill bit that is resistant to prolonged alternating stress, that counteracts the clumping of the abrasively removed material in the helical groove, while avoiding the aforementioned disadvantages.

In essence, a helical drill bit for rock is characterized by an axially extending shank with a chuck insertion end and a tool or drilling head with cutting edges formed of hard-metal arranged between at least one helix with at least one spirally running discharge groove having radial groove reinforcements in the floor or base of the groove, the reinforcements, running along the discharge groove, advantageously periodically changing their geometric form and/or their position within the helical discharge groove.

Thus, without a reduction in the shank resistance to prolonged alternating stress, the form or position of the groove reinforcement changes with respect to the material being conveyed along the helical discharge groove, an obstacle to the flow is created. By the modulation of the groove reinforcement of the groove base and in association with a certain bore hole diameter along the discharge groove, there is a resulting periodic local alteration of groove cross-section surface areas that are available for the transport of the abrasively removed material. Consequently, the material being transported along and inside the discharge groove, which is subject to an approximately constant removal pressure, is further modulated with locally periodic pressure fluctuations that, by the induced transient flows, counteract clumping or accumulation on the surface of the discharge helical groove.

The groove reinforcement is advantageously constructed as a continuous reinforcement rib running along the groove, the rib varying its geometric form in the rib height and/or the rib width along the discharge groove. The continuous design of the groove reinforcements increases the useful axial cross-sectional area for percussive propagation.

Advantageously, the rib cross-section diminishes along the peripheral flow-obstructing discharge groove in the direction of the chuck end, whereby the available discharge cross-section of the discharge groove increases. In this way the material slowed down along the peripherally-running discharge groove is discharged in greater quantities and thus counteracts clumping or accumulation on the surface of the discharge grooves.

The rib heights of the reinforcement ribs advantageously increase in the direction of the chuck end and further extend advantageously partly up to the crest of the helical lands, whereby the guide or lead is improved at the bore hole wall.

The groove reinforcement advantageously varies its position in the discharge groove by the fact of the lead angle of the rib differing slightly from the lead angle of the helical lands. Such a change in position especially promotes the compensating flows that work to prevent clumping or accumulation on the surfaces of the discharge grooves.

Advantageously in an alternative variant, the groove reinforcement is constructed as an interrupted reinforcement rib whose sections are further made curved scoop-like alternating along the circumference of the discharge groove. Due to the changing separation and convergence of the material being transported by the scoop-like sections of the interrupted reinforcement ribs a particularly good distribution of the material is achieved inside the discharge groove and as a result clumping or accumulation on the surface of the discharge groove is counteracted.

BRIEF DESCRIPTION OF THE DRAWING

The invention is more fully explained with reference to advantageous exemplary embodiments read together wherein:

FIG. 1 is an axially extending view of the helical drill bit with reinforcement ribs;

FIGS. 1A, 1B, 1C depict detail sections in accordance with lines A—A, B—B, C—C in FIG. 1; and FIG. 2 is an axially extending view of a helical drill bit with scoop-like reinforcement.

DETAIL OF DESCRIPTION OF THE INVENTION

According to FIG. 1 a helical drill bit 1 for drilling in rock is characterized by an axially extending shank 2 between a chuck insert end 3 and a drilling head 4 having cutting blades 5 made of hard-material and, between two coils or lands 6, 6', a discharge groove 7 extending helically around an axis of rotation A, the discharge groove 7 exhibiting in the groove base 8 a radically projecting groove reinforcement 9, the reinforcement being constructed as a continuous reinforcing rib and, in order to achieve a larger transport cross-section 10, varies its geometric form along the circumferential discharge groove 7 with i=1 . . . 3 in the direction of the chuck insert end 3, in that the rib width $B_i$ diminishes at a faster rate than the rib height $H_i$ increases, that extends to the surface 11 of the lands 6, 6'.

According to FIG. 2, a groove reinforcement 9 is designed as a discontinuous reinforcement rib having alternating scoop-like curved sections 12, where the location in the discharge groove 7 varies by a rib lead angle β, β' differing slightly from the lead angle α of the helix.

What is claimed is:

1. A helical drill bit for drilling in rock comprising an axially extending shank (2) with a chuck insert end (3) at one end and a drilling head (4) at the other end, said shank having at least one axially extending helical discharge groove (7), said groove (7) having a base (8) spaced radially inward from an outer circumferential surface of said shank with a groove reinforcement extending radially outwardly from the groove base (8), and the position and/or geometric form of said groove reinforcement (9) varying in the axial direction of said discharge groove (7), said shank having a helical land forming the outer circumferential surface of said shank, said groove reinforcement (9) has the location thereof in said groove (7) defined by a rib lead angle (β) differing slightly from a lead angle α of said helical land.

2. A helical drill bit, as set forth in claim 1, wherein said groove reinforcement (9) is a continuous reinforcement rib (9).

3. A helical drill bit, as set forth in claim 2, wherein said groove reinforcement rib (9) in the axial direction of said discharge groove (7) varies in at least one of the radial rib height (H) from said groove base (8) and rib width (B) in the axial direction of said shank (2).

4. A helical drill bit, as set forth in claim 3, wherein the rib height (H) increases toward the chuck insert end (3).

5. A helical drill bit, as set forth is claim 4, wherein the rib height (H) extends radially at least partly to the outer circumferential surface of said shank.

6. A helical drill bit, as set forth in claim 1, wherein the rib height (H) of said discharge groove (7) increases towards the chuck insert end (3).

7. A helical drill bit for drilling in rock comprising an axially extending shank (2) with a chuck insert and (3) at one end and a drilling head (4) at the other end, said shank having at least one axially extending helical discharge groove (7), said groove (7) having a base (8) spaced radially inward from an outer circumferential surface of said shank with a groove reinforcement extending radially outwardly from the groove base (8), and the position and/or geometric form of said groove reinforcement (9) varying in the axial direction of said discharge groove (7), wherein said groove reinforcement is formed of discontinuous reinforcement ribs spaced apart in the helical direction.

8. A helical drill bit, as set forth in claim 7, wherein said discontinuous reinforcement ribs have a scoop shaped curved section (12).

9. A helical drill bit, as set forth in claim 8, wherein said sections (12) are alternately curved in opposite directions along said discharge groove (7).

* * * * *